United States Patent [19]

Traynor

[11] Patent Number: 4,653,639
[45] Date of Patent: Mar. 31, 1987

[54] ENVELOPE FOR MAGNETIC DISKS AND JACKETS

[75] Inventor: Gary A. Traynor, Wheaton, Ill.

[73] Assignee: Ames Safety Envelope Company, Somerville, Mass.

[21] Appl. No.: 832,269

[22] Filed: Feb. 21, 1986

[51] Int. Cl.⁴ .............................................. B65D 85/30
[52] U.S. Cl. ..................................... 206/444; 229/72; 229/52 B; 206/312
[58] Field of Search ........................... 383/38, 39, 120; 150/52 B; 229/72; 206/444, 312

[56] References Cited

U.S. PATENT DOCUMENTS

| | | | |
|---|---|---|---|
| 2,860,826 | 11/1958 | Cooke | 229/72 |
| 2,887,327 | 5/1959 | Tucker | 229/72 |
| 3,236,439 | 2/1966 | Johnson et al. | 229/72 |
| 3,399,823 | 9/1968 | Johnson | 229/72 |
| 3,399,824 | 9/1968 | Dodge | 229/72 |
| 4,267,923 | 5/1981 | Baratelli et al. | 229/72 |
| 4,313,558 | 2/1982 | Benham | 229/72 |
| 4,331,290 | 5/1982 | Benham | 229/72 |

Primary Examiner—Joseph Man-Fu Moy

[57] ABSTRACT

A protective envelope for magnetic disks and their jackets includes at least one internal partition extending from one margin and terminating short of the other.

2 Claims, 5 Drawing Figures

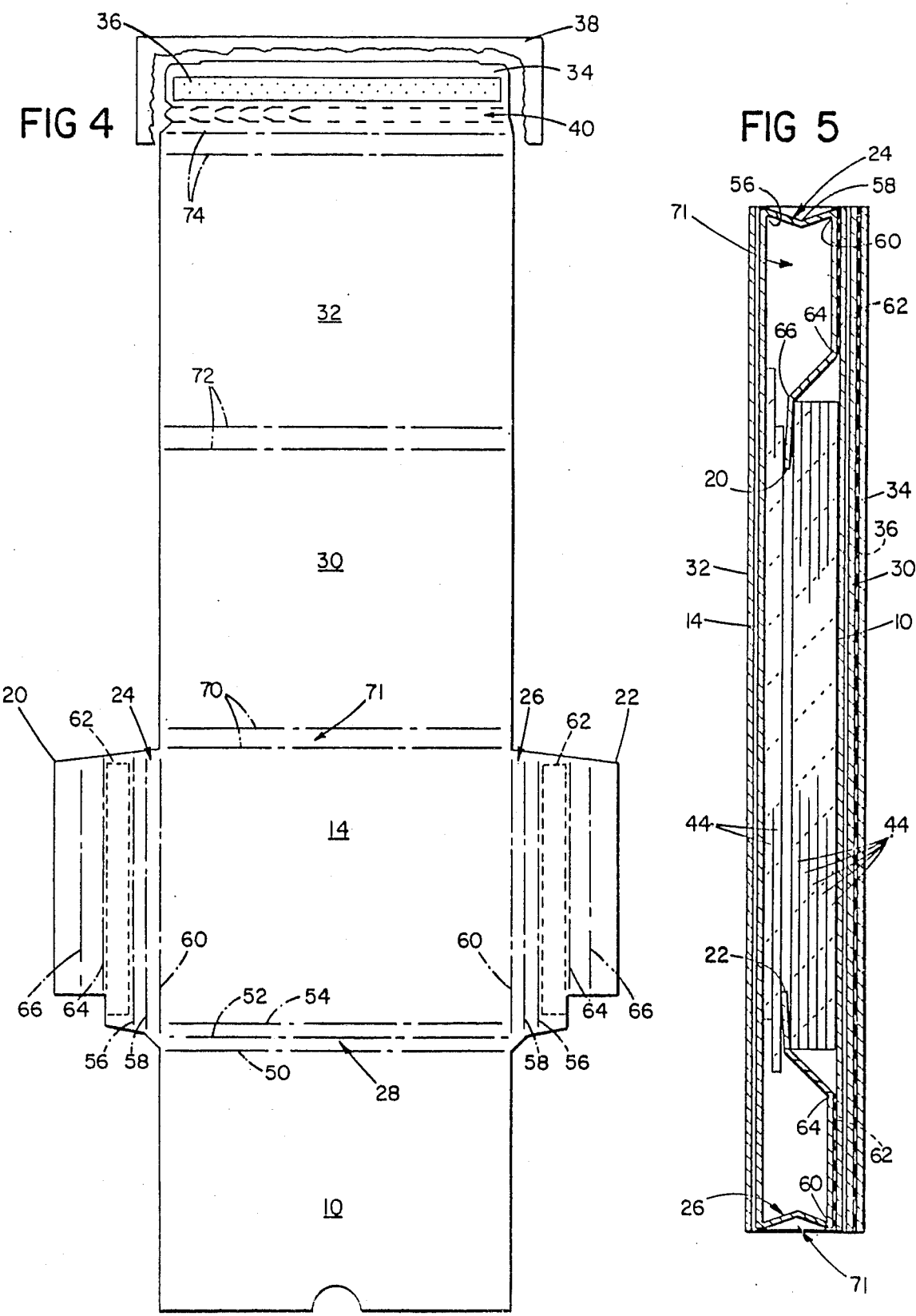

ENVELOPE FOR MAGNETIC DISKS AND JACKETS

This invention relates to an envelope for receiving and protecting magnetic disks and jackets and to a one piece blank for forming such an envelope.

It has previously been proposed in Colangelo U.S. Pat. No. 4,473,153 to provide a protective envelope for a magnetic disk and its jacket, but such envelopes have no provision for storing more than a single disk and its jacket, nor do they provide any means for maintaining multiple disks and jackets separated within the envelope.

In the present invention internal partitions within the envelope serve to maintain separately and to facilitate independent removal of more than a single disk and cartridge within the envelope. In addition, the invention features pleated panels connecting the back and front walls of the envelope, rendering the envelope expansible to accommodate several individual disks with their jackets. Additional features include a closure flap extending the full length of the wall which it overlies and a supplemental flap extending the full length of the other wall, thereby providing double protection for the disks contained within the envelope and facilitating mailing of the envelope without the need for additional packaging.

The present invention accordingly comprises an envelope for receiving and protecting magnetic disks and jackets, said envelope comprising rectangular front and back walls joined along three margins, and having one open margin provided with a closure flap extending from one said wall and adapted to overlie the other said wall, at least one partition extending inwardly from a margin of said envelope adjacent said open margin, said partition terminating short of the opposing margin of the envelope. In a preferred embodiment the envelope includes a pair of partitions, each extending inwardly from an opposing margin of said envelope, and arranged so as to maintain each disk centered in the envelope even when the envelope is oversize, so as to protect the disks during storage or mailing. Printed instructions and informative material can be applied to front wall panel 10, closure flap 30, or even to supplemental flap 32 to be visible only after the envelope has been opened, without the need for additional inserts or supplemental papers.

In the drawings,

FIG. 4 is a plan view of the completed blank including a temporary protective layer for an adhesive strip, partly broken away; and, FIG. 5 is a view in section taken along line 5—5 of FIG. 1.

Figure 1:
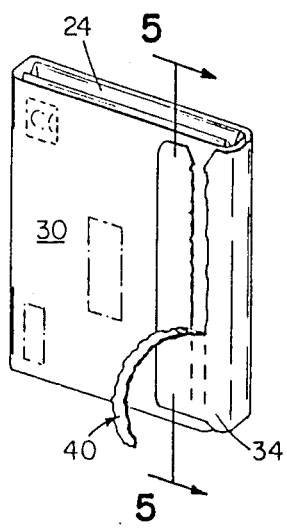
FIG. 1 is an isometric view showing the completed envelope in closed position.

As shown in the drawings, in one embodiment of the present invention, the envelope includes a rectangular front wall panel 10 connected along its bottom margin 12 to a rectangular rear wall panel 14. Extending inwardly from opposing lateral margins 16, 18 of the envelope are partitions 20, 22, each partition terminating short of the margin from which the other partition extends; in the preferred embodiment illustrated, each partition 20, 22 terminates short of the nearest margin of the opposing partition so that the two do not overlap, and each partition is secured to the envelope only at the lateral margin from which it extends. The two lateral margins and bottom margin of wall panels 10 and 14 are joined to each other by pleated panels 24, 26, 28 so that the envelope is expansible. A closure flap 30 extends from rear wall 14 along the open margin of the envelope and is adapted to be folded so as to overlie front wall 10. In the preferred embodiment illustrated, the closure flap 30 extends for the full length of front wall 10 which it overlies and includes a supplemental flap 32 which is adapted to be folded so as to overlie rear wall 14 for its full length. Supplemental flap 32 includes a terminal 34 having a pressure sensitive adhesive facing 36 covered by a removable temporary protective sheet 38. A conventional tear strip 40 is provided between adhesive facing 36 and supplemental panel 32. The envelope is sealed in closed position by removing protective sheet 38 and pressing the adhesive panel 36 against the outer face of closure flap 30 as shown in FIG. 1; opening of the sealed envelope is facilitated by removing tear strip 40 in the manner shown in FIG. 1.

Figure 2:
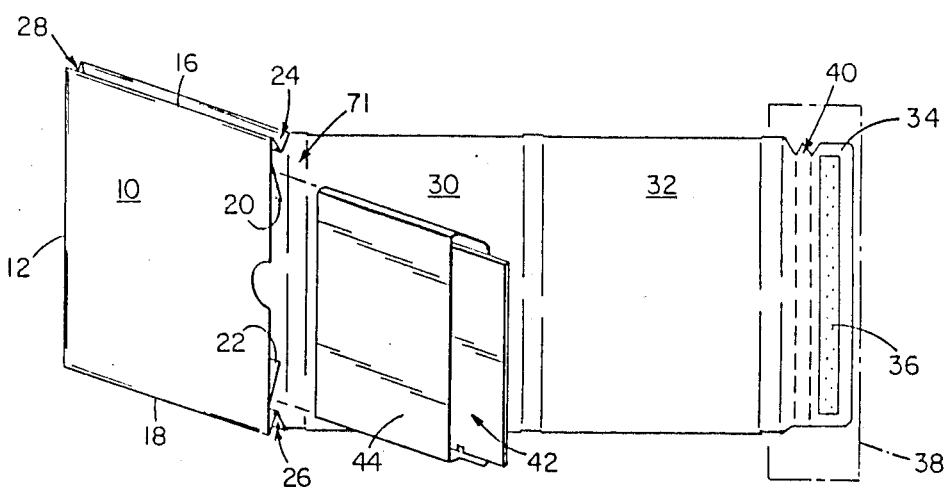
FIG. 2 is a view similar to FIG. 1 showing the envelope in open position preparatory to receiving a disk in its jacket.

A single magnetic disk 42 in its jacket 44 may be inserted in the envelope as shown in FIG. 2 and is held in place by partitions 20, 22. When more than a single disk and jacket are inserted, they may be separated by the partitions as shown in FIG. 5, so that the partitions perform the additional function of facilitating removal of the second disk without removing the first, as well as maintaining the disks centered in the envelope spaced from pleated panels 24,26.

Figure 3:
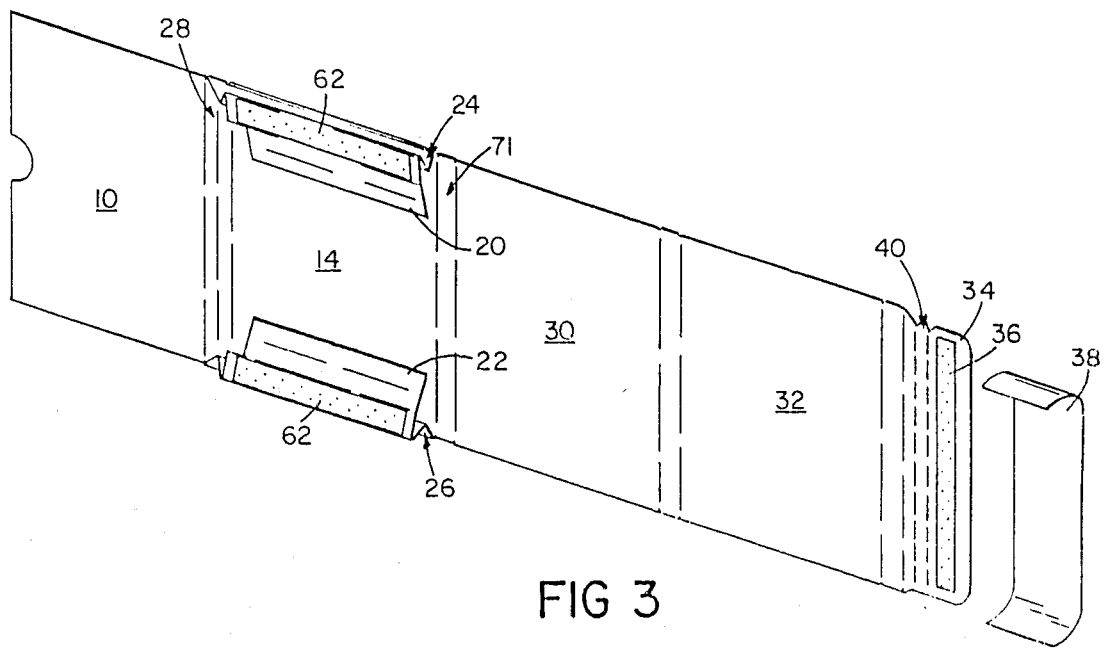
FIG. 3 is an isometric view showing the one piece blank for the envelope, in partially folded condition.

In manufacturing the envelope of the present invention, there is provided a one piece blank of cardboard or other suitable sheet material, as best appears in FIGS. 3 and 4. The blank includes rectangular front and back wall panels 10 and 14 connected along their adjoining margins by a panel 28 defined by score lines 50, 52, 54 which enable it to be pleated by folding along the score lines. Partition-forming panels 20, 22 extend laterally from the opposing margins of back wall panel 14. It will be understood that one or both of these partition-forming panels may extend laterally from one or both of the appropriate margins of front wall panel 10, if desired. Each of partition-forming panels 20, 22 is joined to wall panel 14 by panels 24, 26 defined by score lines 56, 58, 60 about which it can be folded for pleating as shown in FIG. 3, at the same time being folded so that the partitions 20, 22 extend inwardly toward the center of wall panel 14. An adhesive strip 62 is provided on one side of each partition-forming panel so that, after folding, the front wall 10 may be folded so as to overlie back wall panel 14 and be adhesively bonded along its lateral margins to the partition panels. Additional score lines 64, 66 are provided in the partition-forming panels to enable them to be folded so as to accommodate a plurality of magnetic disk and jackets as best appears in FIG. 5. Duplex score lines 70, 72 and 74 are provided at the adjoining margins of closure flap 30, supplemental flap 32 and terminal 34 to enable them to be folded so as to accommodate expansion of pleated flaps 24, 26, 28 when the envelope is filled with several magnetic disks. Between the score lines 70,70 is a panel 71 as seen in FIGS. 4 and 5. Tear strip 40 is formed by providing a double row of spaced interrupted slits 80.

As will be clear from the foregoing description, partition forming panels 20, 22 perform the dual function of providing the inwardly extending partitions and of securing the front wall panel 10 to rear wall panel 14 along their lateral margins, while closure flap 30 and supplemental flap 32 provide additional reinforcement and protection for the front and back walls 10, 14.

What is claimed is:

1. An envelope for receiving and protecting magnetic disks and jackets, said envelope comprising, rectangular front and back walls joined along three margins and having one open margin provided with a closure flap extending from one said wall and adapted to overlie the other said wall, and a pair of partitions extending inwardly from opposing lateral margins of said envelope adjacent said open margin, each said partition terminating short of the nearest margin of the opposing partition, and each said partition being secured to said envelope only at the lateral margin from which it extends, said walls are joined along three side by pleated panels and said envelope is expansible and in which each said partition and the adjoining pleated panel comprises an inwardly folded extension of one side margin of one of said walls, and each said partition is adhesively bonded to the side marginal portion of the other of said wall, said closure flap extending the full length of the wall which it overlies and having a supplemental flap adapted to overlie the other wall, said supplemental flap having an adhesive-faced terminal.

2. An envelope as claimed in claim 1, said adhesive-faced terminal being provided with a tear strip to facilitate opening the envelope.

* * * * *